United States Patent
Fayeulle et al.

(10) Patent No.: US 7,690,100 B2
(45) Date of Patent: Apr. 6, 2010

(54) TECHNIQUES FOR CERTIFYING A HEAD-GIMBAL ASSEMBLY

(75) Inventors: Serge J. Fayeulle, Longmont, CO (US); Paul W. Smith, Niwot, CO (US); Gary E. Bement, Frederick, CO (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 11/717,481

(22) Filed: Mar. 13, 2007

(65) Prior Publication Data

US 2007/0157458 A1    Jul. 12, 2007

Related U.S. Application Data

(62) Division of application No. 10/309,405, filed on Nov. 26, 2002, now Pat. No. 7,194,802.

(60) Provisional application No. 60/367,604, filed on Mar. 26, 2002.

(51) Int. Cl.
*G11B 5/127* (2006.01)
*H04R 31/00* (2006.01)

(52) U.S. Cl. .............. 29/603.03; 29/603.01; 29/603.09; 324/210; 324/212; 360/121; 360/122; 360/317

(58) Field of Classification Search .................. 29/593, 29/603.01, 603.09, 602.1, 737; 324/210, 324/212; 356/345, 357, 369, 360; 451/5, 451/41; 360/121, 122, 126, 317
See application file for complete search history.

(56) References Cited

U.S. PATENT DOCUMENTS 4,845,816 A    7/1989    Nanis 5,063,712 A    11/1991    Hamilton et al.

(Continued)

FOREIGN PATENT DOCUMENTS

JP    05139076 A    6/1993

(Continued)

OTHER PUBLICATIONS

"Shock analysis of MEMS actuator integrated with HGA for operational and non-operational HDD", Lim, B.B.; Yang, J.P.; Chen, S.X.; Mou, J.Q.; Lu, Y.; Magnetic Recording Conference, Aug. 27-29, 2002; pp. WE-P-18-01-WE-P-18-02.

(Continued)

*Primary Examiner*—Paul D Kim
(74) *Attorney, Agent, or Firm*—Shumaker & Sieffert, P.A.

(57) ABSTRACT

A device and method for testing a slider of a head-gimbal assembly during disc drive manufacturing. The device includes a test disc, an actuator arm and a control module. The test disc has a first circumferential area for detecting contact between the slider and the test disc and a second circumferential area for burnishing sliders that contact the first circumferential area as the test disc rotates at or above the predetermined velocity. The head-gimbal assembly is affixed to the actuator arm such that the slider is operable to move between an inner diameter and an outer diameter of the test disc. The control module controls the movement of the actuator arm, and thus the slider, relative to the test disc. The control module monitors the slider-disc interface for contact therebetween. If contact is detected, the slider is either burnished or the head-gimbal assembly is discarded altogether.

19 Claims, 5 Drawing Sheets

U.S. PATENT DOCUMENTS

| | | | |
|---|---|---|---|
| 5,067,037 A | 11/1991 | Ananth et al. | |
| 5,153,785 A | 10/1992 | Muranushi et al. | |
| 5,200,867 A | 4/1993 | Albrecht et al. | |
| 5,267,104 A | 11/1993 | Albrecht et al. | |
| 5,292,585 A | 3/1994 | Ohnoki et al. | |
| 5,431,592 A | 7/1995 | Nakata | |
| 5,545,989 A * | 8/1996 | Tian et al. | 324/212 |
| 5,562,965 A | 10/1996 | Gui et al. | |
| 5,593,341 A | 1/1997 | Gonnella et al. | |
| 5,658,191 A | 8/1997 | Brezoczky | |
| 5,659,447 A | 8/1997 | Gregory et al. | |
| 5,708,540 A | 1/1998 | Ananth et al. | |
| 5,758,406 A | 6/1998 | Hunsaker et al. | |
| 5,782,680 A | 7/1998 | Pilsan | |
| 5,818,592 A | 10/1998 | Womack et al. | |
| 5,825,180 A | 10/1998 | Guzik | |
| 5,825,181 A | 10/1998 | Schaenzer et al. | |
| 5,841,608 A | 11/1998 | Kasamatsu et al. | |
| 5,863,237 A | 1/1999 | Felts et al. | |
| 5,885,131 A | 3/1999 | Azarian et al. | |
| 5,887,336 A | 3/1999 | Watanabe | |
| 5,939,624 A | 8/1999 | Smith, Jr. | |
| 5,980,369 A | 11/1999 | Burga et al. | |
| 6,003,364 A | 12/1999 | Yao et al. | |
| 6,040,958 A | 3/2000 | Yamamoto et al. | |
| 6,052,243 A | 4/2000 | Shimada | |
| 6,057,975 A | 5/2000 | Yaeger et al. | |
| 6,097,559 A | 8/2000 | Ottesen et al. | |
| 6,112,401 A | 9/2000 | Smith, Jr. | |
| 6,230,380 B1 | 5/2001 | Wang et al. | |
| 6,239,951 B1 | 5/2001 | Wang et al. | |
| 6,322,431 B1 | 11/2001 | Schaenzer et al. | |
| 6,366,416 B1 | 4/2002 | Meyer et al. | |
| 6,384,995 B1 | 5/2002 | Smith | |
| 6,408,677 B1 * | 6/2002 | Suzuki | 73/1.89 |
| 6,493,184 B1 * | 12/2002 | Smith | 360/135 |
| 6,503,132 B2 | 1/2003 | Ekstrum et al. | |
| 6,548,140 B1 | 4/2003 | Gui et al. | |
| 6,580,572 B1 * | 6/2003 | Yao et al. | 360/25 |
| 2003/0182788 A1 | 10/2003 | Fayeulle | |

OTHER PUBLICATIONS

A.M. Homola et al., "Overcoats and Lubrication for Thin Film Disks," *MRS Bulletin*, Mar. 1990, p. 45-52.

C. Mathew Mate, "Application of disjoining and capillary pressure to liquid lubricant films in magnetic recording," *J. Appl. Phys.*, 72(7), Oct. 1, 1992, p. 3084-3090.

C. Hardie et al., "Analysis and Performance Characteristics of The Seagate Advanced Air Bearing Slider," *IEEE Transactions of Magnetics*, 30(2), Mar. 1994, p. 424-432.

McHugh et al., "Supercritical Fluids," *Encyclopedia of Polymer Science and Engineering*, vol. 16, $2^{nd}$ Edition 1989 John Wiley & Sons, Inc. p. 368-399.

* cited by examiner

TECHNIQUES FOR CERTIFYING A HEAD-GIMBAL ASSEMBLY

RELATED APPLICATIONS

This application claims priority to U.S. patent application Ser. No. 10/309,405, filed Nov. 26, 2002, which claims the benefit of U.S. provisional application Ser. No. 60/367,604, filed Mar. 26, 2002, the entire contents of which are incorporated herein by reference.

FIELD OF THE INVENTION

This application relates generally to disc drives and more particularly to certifying head-gimbal assemblies for use in disc drives.

BACKGROUND OF THE INVENTION

Modern hard disc drives comprise one or more rigid discs that are coated with a magnetizable medium and mounted on a spindle hub of a spindle motor for rotation at a high speed. Information is written to and read from tracks on the discs through the use of an actuator assembly, which rotates during a seek operation. A typical actuator assembly includes a plurality of actuator arms. The actuator arms extend toward the discs. One or more flexures extend from each of the actuator arms. Mounted at the distal end of each of the flexures is a read/write head. The read/write head is affixed to a fluid-bearing slider that enables the read/write head to fly in close proximity above the corresponding surface of the associated disc. The fluid can be air or alternatively an inert gas, such as, but not limited to, helium. As rotational velocity of the disc decreases, the layer of fluid supporting the slider above the disc surface diminishes and the slider, and thus the read/write head, descends toward the disc surface. Contact between the slider/head assembly and the disc surface can damage the magnetizable medium and the read/write head.

Storage capacity of a hard disc drive may be increased by increasing the number of tracks per inch (TPI) on discs in the disc drive. In order to increase TPI, however, it is necessary to decrease the magnetic spacing between a read/write head and active magnetic layers deposited on the surface of the corresponding disc. This magnetic spacing includes a carbon coating on the read/write head, pole tip recession, gap fly height, a carbon overcoat deposited over the active magnetic layers and lubricant deposited over the carbon overcoat. Gap fly height is a measurement that represents the distance between a read/write head and the lubricant deposited over the carbon overcoat on the corresponding disc.

Due to increasing TPI, gap fly height is significantly decreasing. Indeed, future products may have a gap fly height of lower than 0.5 microinches. Depending on variability in manufacturing and design processes, increasing TPI in disc drives may force sliders into intermittent or even continuous contact with the surface of the corresponding disc. Many disc drive manufacturers are thus limited with respect to the amount of storage capacity that may be realized by increasing TPI.

SUMMARY OF THE INVENTION

Against this backdrop the present invention has been developed. An embodiment of the present invention is a device and method for testing a slider of a head-gimbal assembly during disc drive manufacturing. The tool includes a test disc, an actuator arm and a control module. The head-gimbal assembly is affixed to a support on the actuator arm such that the slider is operable to move between an inner diameter and an outer diameter of the test disc. The control module controls rotation of the test disc and movement of the actuator arm, and thus the slider, relative to the test disc. As the test disc is being rotated at or above a predetermined velocity, the control module positions the slider over the test disc and monitors the slider-disc interface for contact between the slider and the test disc. If contact is detected, the surface of the slider that interfaces the test disc is either burnished or the head-gimbal assembly is discarded altogether.

In accordance with an embodiment, the test disc includes a first circumferential area used to detect contact between the slider and the test disc. The first circumferential area has a surface roughness substantially the same as a surface roughness associated with a data storage disc to which the head-gimbal assembly will interface in a disc drive. In this embodiment, the test disc is accelerated to rotate at a nominal rotational velocity. Once the test disc reaches the nominal rotational velocity, the head-gimbal assembly is positioned over the first circumferential area. The slider flies above the surface of the first circumferential area so long as an adequate velocity is maintained by the test disc. The rotational velocity of the test disc is decreased to the predetermined velocity as the head-gimbal assembly flies over the surface of the first circumferential area. The present invention monitors the slider-disc interface for detection of contact there between as the rotational velocity of the test disc decreases from the nominal velocity to the predetermined velocity. The surface of the slider interfacing the test disc is burnished if the slider contacts the surface of the first circumferential area.

In accordance with yet another embodiment, the test disc includes a second circumferential area used to burnish sliders that contact the first circumferential area as the test disc rotates at or above the predetermined velocity. Burnishing is defined as wearing down or rubbing away using friction. The second circumferential area has a surface roughness sufficiently high to ensure contact between the slider and the second circumferential area as the test disc rotates at the test velocity. Contact between the slider and the second circumferential area burnishes the slider.

Embodiments of the various operations of the invention may be implemented as a computer-readable program storage device which tangibly embodies a program of instructions executable by a computer system to test the slider for contact with the test disc, and if contact is detected, to control burnishing of the slider using the test disc.

These and various other features as well as advantages which characterize the present invention will be apparent from a reading of the following detailed description and a review of the associated drawings.

DETAILED DESCRIPTION

Figure 1:
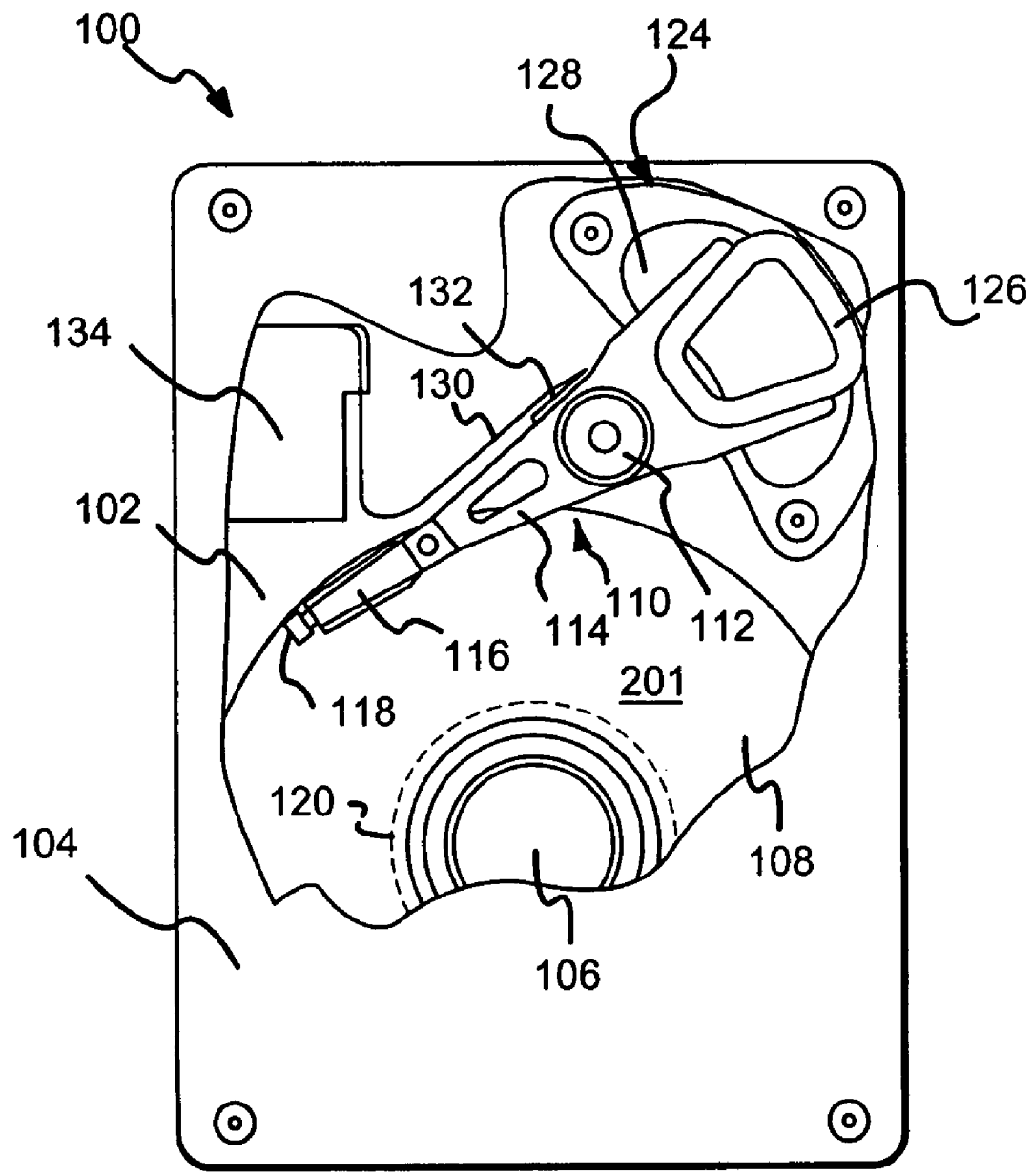
FIG. 1 is a plan view of a disc drive incorporating a preferred embodiment of the present invention with a portion of the top cover broken away to show the primary internal components, including an actuator assembly and a disc.

The present invention and its various embodiments are described in detail below with reference to the figures. When referring to the figures, like structures and elements shown throughout are indicated with like reference numerals.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive 100 in a conventional manner. The components include a spindle motor 106 which rotates one or more discs 108 at a constant high speed. Information is written to and read from tracks 306 (FIG. 3) on the discs 108 through the use of an actuator assembly 110, which rotates about a bearing shaft assembly 112 positioned adjacent to the discs 108. The actuator assembly 110 includes a plurality of actuator arms 114 which extend towards the discs 108, with one or more flexures 116 extending from each of the actuator arms 114. Mounted at the distal end of each of the flexures 116 is a read/write head 118. The read/write head 118 is affixed to a lower surface 212 (See FIG. 2) of a fluid-bearing slider 204 (See FIG. 2) that enables the read/write head 118 to fly in close proximity above the corresponding surface of the associated disc 108.

The spindle motor 106 is typically de-energized when the disc drive 100 is not in use for extended periods of time. In accordance with a first embodiment of the present invention, the read/write heads 118 are moved over park, or landing, zones 120 near the inner diameter 136 of the discs 108 when the drive motor is de-energized. The read/write heads 118 may be secured over the landing zones 120 through the use of an actuator latch arrangement, which prevents inadvertent rotation of the actuator assembly 110 when the heads 118 are parked. Although the landing zone 120 is shown in FIG. 1 as located in close proximity to the inner diameter 136 of the discs 108, a landing zone 120 may also be located in close proximity to an outer diameter 138 of the discs 108. Furthermore, a landing zone 120 may be located on any portion of the discs 108 between the outer diameter 138 and the inner diameter 136 of the discs 108.

In accordance with a second embodiment of the present invention, the read/write heads 118 may be removed from the surface of the discs 108 by a load/unload ramp positioned in close proximity to the outer diameter 138 when the drive motor is de-energized. As such, the read/write heads 118 may be secured by the ramps to prevent inadvertent rotation of the actuator assembly 110 when the discs 108 are spinning at a velocity insufficient to maintain a fluid bearing between the sliders and the discs 108. The heads 118 are maintained on the ramps in the park position through the use of an actuator latch arrangement, which prevents inadvertent rotation of the actuator arms 114 when the heads are parked. This latch arrangement is typically a magnetic latch which magnetically holds the actuator against a stop.

The radial position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112 and the heads 118 are caused to move across the surfaces 201 of the discs 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
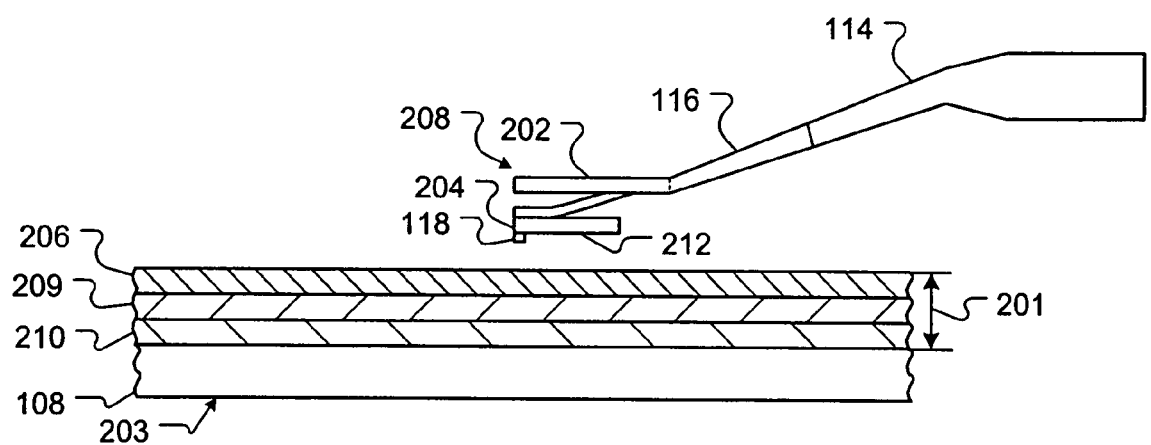
FIG. 2 illustrates various parts of the actuator assembly and the disc shown in FIG. 1.

FIG. 2 depicts the interface between the read/write head 118 and the disc 108 of FIG. 1 in accordance with an embodiment of the present invention. FIG. 2 is a representation of the head-disc interface as the disc 108 is rotating in a predetermined direction and at a predetermined velocity sufficient to create and maintain a fluid bearing between the slider 204 and the disc surface 201. As such, the slider 204 is shown flying above an upper surface 201 of the disc 108. The fluid can be air or alternatively an inert gas, such as, but not limited to, helium.

The read/write head 118 is attached to the slider 204. The slider 204 enables the head 118 to fly over the disc surface 201 as the disc 108 rotates below the head 118. A fluid bearing is created between the underside 212 of the slider 204 and the disc surface 201 as the disc 108 rotates under the slider 204. The underside 212 of the slider 204 is thus referred to herein as a "fluid-bearing" surface. The distance between the read/write head 118 and the disc surface 201 is the gap fly height of the head-disc interface.

The slider 204 is connected to a flexure 116 through the use of a gimbal 202. The gimbal 202 enables the slider 204 to pivot or "gimbal" about a point as the slider 204 flies above the disc surface 201. The flexure 116 couples the gimbal 202 to an actuator arm 114. In operation, a disc drive microprocessor (not shown) rotates the actuator arm 114 over the disc surface 201 such that the read/write head 118 is operable to access a desired track on the disc surface 201.

The read/write head 118, the slider 204 and the gimbal 202 collectively form a head-gimbal assembly 208. In accordance with an embodiment, the head-gimbal assemblies 208 used in a disc drive 100 are manufactured separately from the other actuator assembly components, such as, without limitation, the flexures 116 and the actuator arms 114. After a head-gimbal assembly 208 is complete, the head-gimbal assembly 208 is attached to a flexure 116 that is mounted to an actuator arm 114. At this time in the disc drive manufacturing process, the actuator arm 114 is coupled to an actuator assembly 110. The actuator assembly 110 may be coupled to other actuator arms 114 as well. The head-gimbal assembly 208, the flexure 116 and the actuator arm 114 collectively form a head stack assembly (not shown separately). Finally, the head stack assembly is combined with a stack of discs 108 to form a head-disc assembly (not shown separately). As described in more detail with the head-gimbal assembly certification tool (400) shown in FIG. 4 and method (500) shown in FIG. 5, it is with respect to manufacturing processes of the head-gimbal assembly 208 that the present invention is implemented.

The surface 201 of the disc 108 includes an active magnetic layer 210, a carbon overcoat layer 209 and a lubricant layer 206 in accordance with an embodiment of the present invention. The active magnetic layer 210 is used to store data on the disc 108. To write data to the disc 108, the read/write head 118 magnetizes particles of the active magnetic layer 210 based on a predetermined polarity sequence as the head 118 flies over the disc surface 201. To read data stored on the disc 108, the read/write head 118 detects the polarity of previously magnetized particles. The carbon overcoat layer 209 and the lubricant layer 206 are used to protect the active magnetic layer 210 against contact by the slider 204.

In accordance with an alternative embodiment, the surface 201 may include any one or more of the layers shown in FIG. 2. Moreover, the surface 201 may not include any of the layers shown in FIG. 2, but rather include other forms of data storage media, such as, without limitation, the form of media used with optical storage discs. Although not shown, it should be appreciated that the underside surface 203 of the disc 108 may also include an active magnetic layer, a carbon overcoat and a lubricant layer such that a corresponding read/write head may access, i.e., read data from or write data to, the underside 203 of the disc 108.

The disc 108 shown in FIG. 2 is a conventional design for a data storage disc, but the scope of the invention includes other disc designs. Orientation terms such as "under," "top," "up" and "down" are used for convenience, but the disc 108 can be oriented in many different ways so long as it is appropriately oriented relative to the read/write head 118. The disc 108 and the various layers deposited thereon are comprised of conventional materials and formed according to known manufacturing methods.

Figure 3:
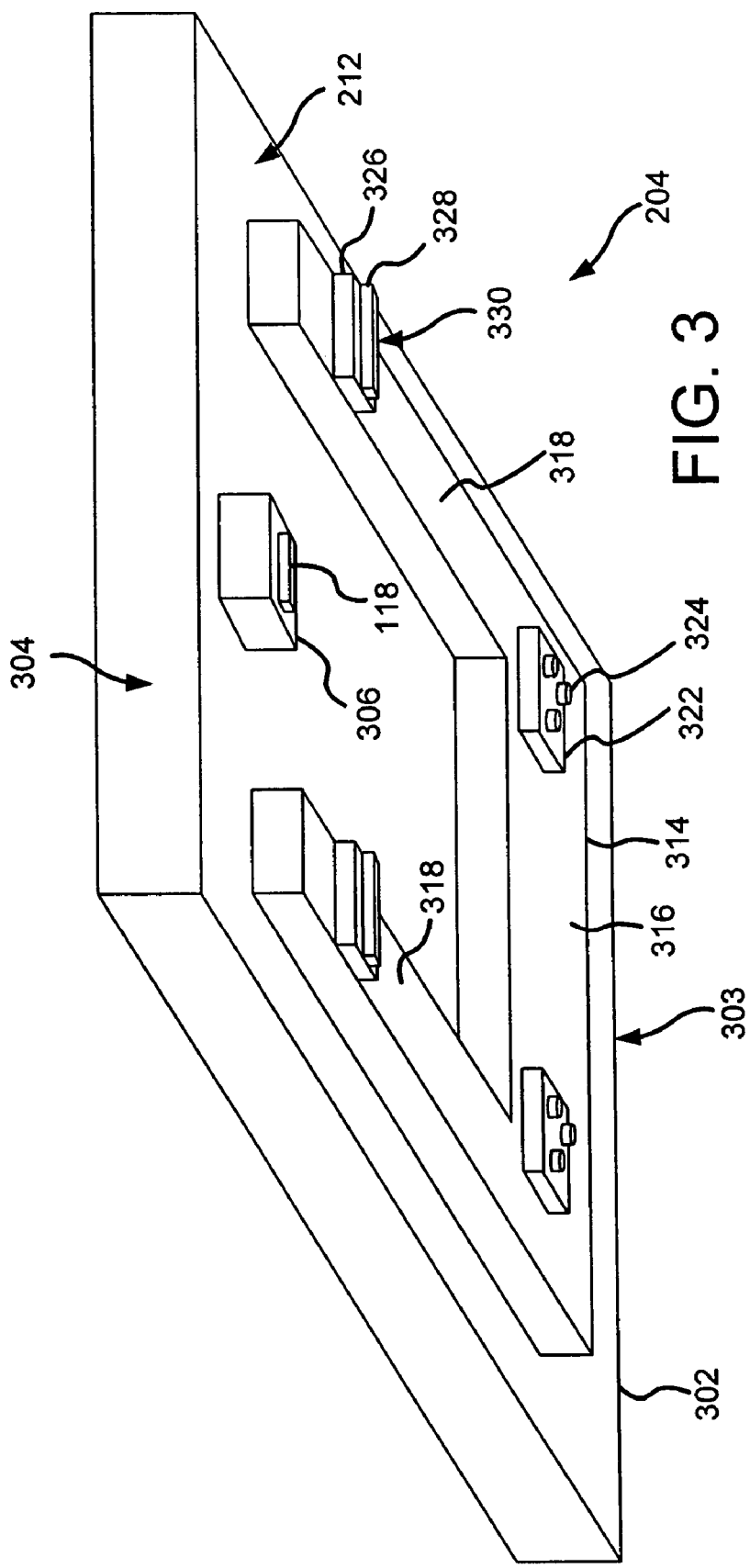
FIG. 3 is a perspective view of a head according to an embodiment of the present invention.

FIG. 3 depicts the fluid-bearing surface 212 of a slider 204 that faces a corresponding surface 201 of the disc 108 (see FIG. 1) in accordance with an exemplary embodiment of the present invention. The slider 204 shown in FIG. 3 is a conventional design, but the scope of the invention includes other slider designs. Orientation terms such as "under", "down", and "up" are used for convenience, but the slider 204 can be oriented in many different ways so long as it is appropriately oriented relative to the corresponding disc surface 201 (see FIG. 1). The slider 204 is preferably comprised of conventional materials and formed according to known manufacturing methods.

The slider 204 includes a body 302, which may be any of various known shapes, but is shown in FIG. 3 as a rectangular block. The body 302 defines a leading edge 303 that is the first portion of the slider 204 to encounter a particular section of the disc surface 201 as the disc 108 rotates beneath the slider 204. A trailing edge 304 of the body 302 faces opposite the leading edge 303. A head riser 306 depends from the body 302 near the trailing edge 304, and a read/write head 118 is mounted on the head riser 306 distal from the body 302.

In accordance with an embodiment, a generally U-shaped rail 314 depends from the body 302. The rail 314 includes a base 316 near the leading edge 303 and arms 318 extending rearward from opposing sides of the base 316 so that the U-shaped rail 314 opens toward the read/write head 118. Leading contact pad risers 322 depend from opposite ends of the base 316 of the rail 314. Leading contact pads 324 depend from the leading contact pad risers 322 toward the disc surface 201. Near the trailing ends of the arms 318, trailing contact pad risers 326 depend from the rail 314, and trailing contact pads 328 depend from the trailing contact pad risers 326.

In the embodiment shown in FIG. 3, the leading contact pads 324 and the trailing contact pads 328 are at approximately the same height relative to the disc surface 201 when the slider 204 is resting on the disc surface 201. However, when the disc 108 rotates at such a speed that slider 204 flies above the disc surface 201, the leading edge 303 flies higher than the trailing edge 304. During flight the trailing contact pads 328 are lower (i.e., closer to the disc surface 201) than the leading contact pads 324. Accordingly, if any part of the slider 204 contacts the disc surface 201 during flight, it is likely that a downwardly facing surface portion 330 of one or more trailing contact pads 328 will contact surface 201.

Of course, the surface portion 330 could be the entire downwardly facing surface of the contact pad 328 or only a portion of it. In operation, as a disc 108 rotates beneath the slider 204, the read/write head 118 flies above the disc surface 201 a predetermined distance called a gap fly height. With the decreases in fly height, it is desirable to have the contours of the pad surface portions 330 be smooth and precisely fit to the corresponding disc surface 201 so that asperities in the pad surface portions 330 do not inadvertently contact the disc surface 201 during normal operation of the disc drive 100.

Figure 4:
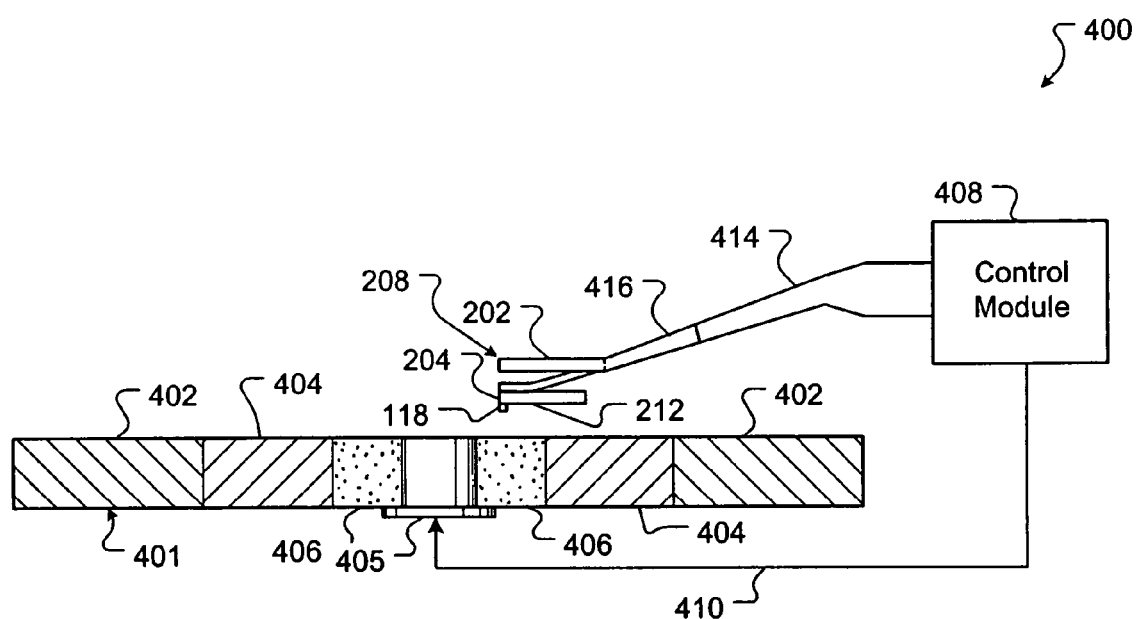
FIG. 4 is a block diagram of a tool for certifying a head-gimbal assembly in accordance with an embodiment of the present invention.

FIG. 4 is a block diagram of a tool 400 for certifying ("certification tool") a head-gimbal assembly 208 in accordance with an embodiment of the present invention. Generally, certifying a head-gimbal assembly, such as 208, refers to a process for testing the head-gimbal 208 assembly for manufacturing defects and, if a defect is found, either discarding the head-gimbal assembly 208 or correcting the defect. Such a defect may be that a slider, such as 204, of the head-gimbal assembly 208 is likely to contact a corresponding disc surface, such as 201. With this defect, the correction of such may be burnishing the slider 204 such that contact with the corresponding disc surface 201 is less likely or simply discarding the head-gimbal assembly 208 altogether.

The certification tool 400 is used following manufacture of the head-gimbal assembly 208 to detect whether the slider 204 is likely to contact a corresponding disc surface 201 during normal drive operation. The certification tool 400 may also be used to burnish the fluid-bearing surface 212 on the underside of the slider 204 to minimize the probability that slider 204 will contact the disc surface 201 during normal disc drive operation. Burnishing, which may also be referred to herein as abrading, is defined as wearing down or rubbing away using friction. The certification tool 400 may also be used to reject a head-gimbal assembly 208 that contains a slider 204 that will contact a corresponding disc surface 201 during normal drive operation, if such contact is detected following a predetermined number of burnishing operations.

Figure 5:
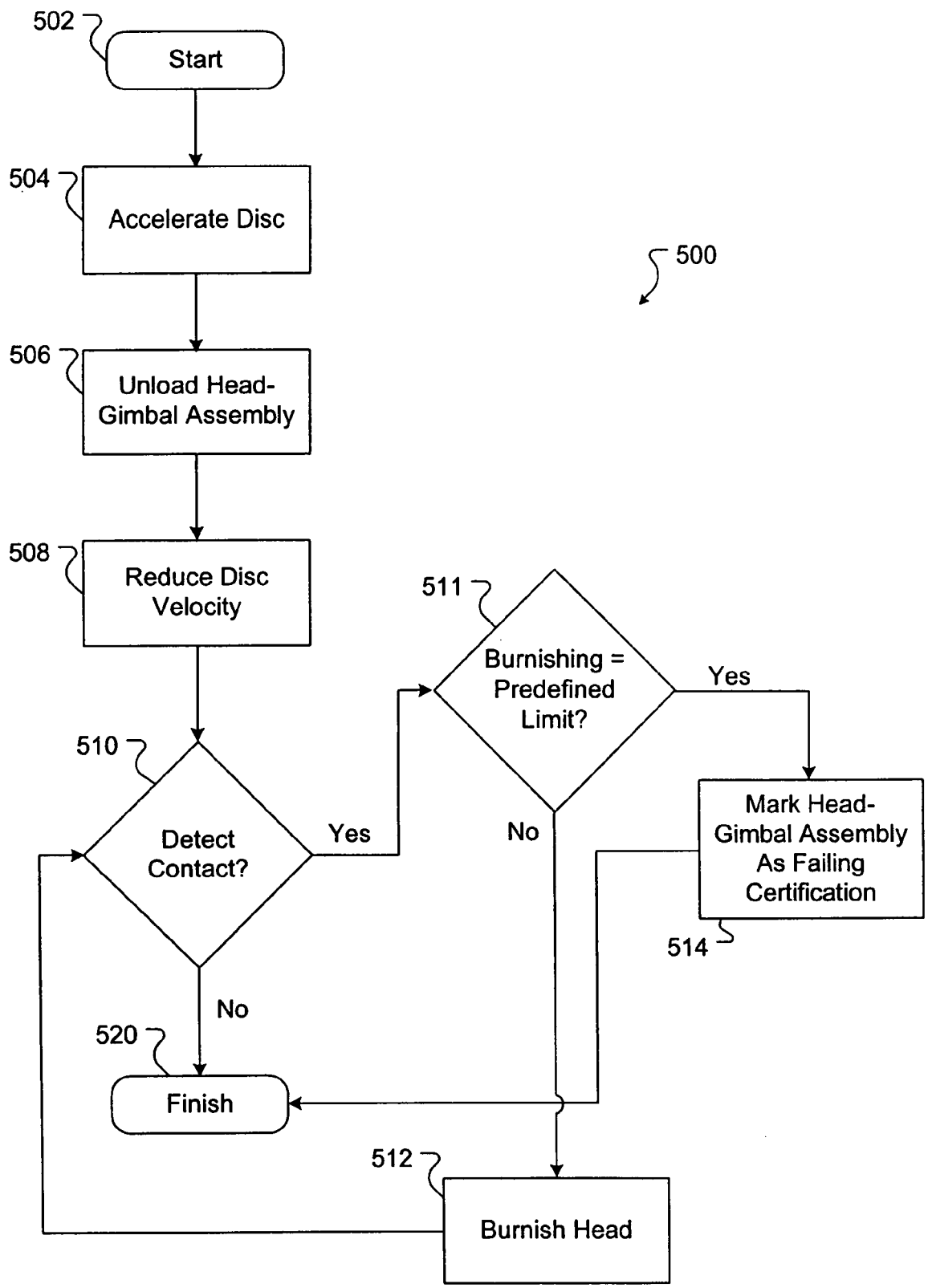
FIG. 5 is a flow diagram illustrating operations used by the tool of FIG. 4 to certify a head-gimbal assembly according to an embodiment of the present invention.

The certification tool 400 includes a test disc 401 and a control module 408 in accordance with an embodiment of the present invention. The control module 408 utilizes the test disc 401 to perform a certification process on the head-gimbal assembly 208 being tested by the certification tool 400. Such a certification process 500 is illustrated by a flow diagram shown in FIG. 5. Because the certification process 500 is a process of operations performed by the certification tool 400, and more particularly the control module 408, to certify a head-gimbal assembly 208, FIGS. 4 and 5 are described below in tandem.

The certification process 500 may be implemented either through hardware or firmware, i.e., as a computer-readable program storage device which tangibly embodies a program of instructions executable by a computer system, to certify a head-gimbal assembly 208 in accordance with embodiments of the present invention. As such, the logical operations of the certification process 500 may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the certification process 500. Accordingly, the logical operations making up the certification process 500 described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The certification tool 400 includes a spindle 405 operable to rotate the test disc 401 at a speed up to or above the rotation speeds realized during normal disc drive operation. The certification tool 400 also includes a test actuator arm 414 having a test flexure 416 to which the head-gimbal assembly 208 being certified is attached. As with normal disc drive operation, the test actuator arm 414 and test flexure 416 are operable to move the head-gimbal assembly 208 to any location on the test disc 401 between an inner diameter and an outer diameter. The control module 408 controls movement of the test actuator arm 414 and the test flexure 416 relative to the test disc 402. The control module 408 also controls rotation of the spindle 405, and thus, the test disc 401.

In accordance with an embodiment, the test disc 401 includes 1) a contact detection area 404 for detecting contact between the fluid-bearing surface 212 and the disc surface 201; and 2) a burnishing area 402 for burnishing the fluid-bearing surface 212 if contact is indeed detected in the contact detection area 404. The burnishing area 402 is shown located closer to the outer diameter of the disc 108 in relation to the contact detection area 404 in accordance with an exemplary embodiment of the present invention. It should be appreciated that the locations of the contact detection area 404 and the burnishing area 402 may be switched such that the contact detection area 404 is located closer to the outer diameter of the disc 108 in relation to the burnishing area 402. The test disc 401 may also include a landing zone 406 wherein the head-gimbal assembly 208 is moved when the rotational velocity of the test disc 108 is insufficient to create or maintain a fluid bearing between the slider 204 and the disc surface 201. In accordance with an embodiment wherein the head-gimbal assembly 208 is to be used in a disc drive 100 utilizing a load/unload ramp configuration rather than a landing zone 406, the certification tool 400 may include a load/unload ramp for storing the head-gimbal assembly 208 while the test disc 401 is either 1) not rotating or 2) rotating at a velocity insufficient to create and/or maintain the fluid bearing. In this embodiment, the test disc 401 does not include a landing zone 406.

The contact detection area 404 has substantially the same properties as discs 108 used during normal operation of a disc drive 100 in accordance with an embodiment of the present invention. That is, the contact detection area 404 has substantially the same glide avalanche (typically 0.25 microinches and below), microwaviness and surface roughness (typically a few Angstroms) as the disc 108 that the head-gimbal assembly 208 will be paired with for normal operation. Glide avalanche is the height at which contact is first detected using a special head referred to as a glide head. Microwaviness is the part within the glide avalanche that corresponds to geometric features in the range of microns to hundreds of microns (range in the disc plane, not in the height direction perpendicular to the disc).

The burnishing area 402 is used to correct head-disc contact problems detected on the contact detection area 404 by wearing down various components, e.g., contact pads, etc., located on the fluid-bearing surface 212. For this reason, the burnishing area 402 has substantially different geometrical properties than the contact detection area 404. In particular, the burnishing area 402 is associated with a higher surface roughness, and therefore a higher glide avalanche, than the contact detection area 404. For example, in accordance with an embodiment of the present invention, the surface roughness of the contact detection area 404 may be below 5 A. As such, the surface roughness of the burnishing area 402 may be higher, such as 7 A.

The certification process 500 is performed using an operation flow beginning with a start operation 502 and terminating with a stop operation 520. The start operation 502 is initiated after a head-gimbal assembly 208 is attached to the test flexure 416. From the start operation 502, the operation flow passes to a disc accelerate operation 504.

The disc accelerate operation 504 accelerates the spindle 406 to a nominal rotational velocity. In accordance with an exemplary embodiment of the present invention, the nominal rotational velocity may be, for example, 7200 rpm. The nominal rotational velocity may be set to any desired velocity using a user interface to the control module 408. To accomplish the nominal rotational velocity, the control module 408 controls the spindle 406 using control lines 410. The control lines 410 may be any type of communication medium through which commands and instructions may be issued by the control module 408 and received by a spindle motor (not shown) coupled to the spindle 406. The operation flow passes from the disc accelerate operation 504 to an slider positioning operation 506 after the spindle 406 reaches the nominal rotational velocity.

The slider positioning operation 506 moves the head-gimbal assembly 208 such that the slider 204 is positioned above the contact detection area 404. Once the head-gimbal assembly 208 is located over the contact detection area 404, the operation flow passes to a reduce velocity operation 508. The reduce velocity operation 508 begins decreasing the rotational velocity of the spindle 406 to a pre-determined rotational velocity, hereinafter referred to as a "test velocity." In accordance with an exemplary embodiment of the present invention, the test velocity may be, for example, 3000 rpm. The test velocity may be set to any desired velocity using the user interface to the control module 408. To accomplish the test velocity, the control module 408 controls the spindle 406 using the control lines 410. The operation flow passes from the reduce velocity operation 508 to a contact query operation 510 as the rotational velocity decreases toward the test velocity.

The contact query operation 510 determines whether the fluid-bearing surface 212 of the slider 204 has contacted the contact detection area 404 as the rotational velocity of the test disc 108 is decreasing from the nominal velocity to the test velocity. In accordance with an embodiment, contact detection is achieved using Acoustic Emission (AE) detection, wherein a microphone outputs an AE signal representing noise levels detected between the fluid-bearing surface 212 and the surface of the contact detection area 404. In this embodiment, contact is detected if the AE signal level goes above a pre-determined level. It should be appreciated that the contact query operation 510 may utilize means other than AE detection, e.g., any type of sensor, to detect contact between the fluid-bearing surface 212 and the contact detection area 404. For instance, the contact query operation 510 may use a Laser Doppler vibrometer to detect such contact or any appropriate electrical signal read by the head.

If the contact query operation 510 detects contact between the fluid-bearing surface 212 and the contact detection area 404, the operation flow branches to second query operation 511. If the contact query operation 510 does not detect contact between the fluid-bearing surface 212 and the contact detection area 404, the operation flow concludes at the stop operation 520. In these circumstances, the head-gimbal assembly 208 is certified and therefore ready to be attached to a head stack assembly.

The second query operation 511 determines whether the fluid-bearing surface 212 has already been burnished a predefined number of times. This predefined number sets a limit to the number of times that the fluid-bearing surface 212 may be burnished. If the fluid-bearing surface 212 has been burnished the predefined number of times, the operation flow passes to a mark fail operation 514. The mark fail operation 514 marks the head-gimbal assembly 208 as failing the certification process 500. In these circumstances, the head-gimbal assembly 208 is not affixed to a head stack assembly 208 and therefore not included with a completed disc drive 100. Instead, the head-gimbal assembly 208 is marked to be discarded. From the mark fail operation 514, the operation flow concludes at the stop operation 520. If the second query operation 511 determines that the fluid-bearing surface 212 has not been burnished the predefined number of times, the operation flow passes to a burnish operation 512.

While the spindle 406 is still being rotated at the test velocity, the burnish operation 512 moves the head-gimbal assembly 208 to the burnishing area 402 on the test disc 401. The fluid-bearing surface 212 contacts the burnishing area 402, thereby causing the parts contained thereon, e.g., contact pads, etc., to be abraded, i.e., worn down or rubbed away by friction, as the relatively rough disc surface rotates below. The head-gimbal assembly 208 is maintained on the burnishing area 402 for a predetermined time period. This time period may be set using the user interface of the control module 408. The predetermined time period is set as an estimate on the time that it would take to burnish the fluid-bearing surface 212 down to a level in which the surface 212 will not contact the disc surface 201 at the test velocity. The predetermined time set for burnishing may be minimized by using a burnishing area 402 with a relatively higher degree of surface roughness. Following expiration of the predetermined time period, the operation flow passes from the burnish operation 512 back to the contact query operation 510 and the operation flow passes as previously described.

In summary, the present invention may be viewed as a device (such as 400) for certifying a head-gimbal assembly (such as 208) for use in a disc drive (such as 100). The head-gimbal assembly includes a read/write head (such as 118) for accessing data stored on a data storage disc (such as 108). The read/write head is affixed to a fluid-bearing surface (such as 212) of a slider (such as 204). The slider enables the read/write head to fly over the data storage disc as the disc is rotated about a spindle (such as 106).

In this embodiment, the device of the present invention includes a test disc (such as 401). The test disc has a first circumferential area (such as 404) of a predetermined surface roughness. The test disc is operable to rotate between a nominal velocity and a test velocity. The device also includes an actuator arm (such as 414) having a flexure (such as 416) supporting the head-gimbal assembly over the first circumferential area as the test disc rotates between the nominal velocity and the test velocity. The device further includes a control module (such as 408) that detects whether the fluid-bearing surface of the slider contacts the first circumferential area.

In accordance with an embodiment, the test disc includes a second circumferential area (such as 402) having a predetermined surface roughness greater than the predetermined surface roughness of the first circumferential area. The predetermined surface roughness of the second circumferential area is sufficiently high to ensure contact between the fluid-bearing surface and the second circumferential area as the test disc rotates at the test velocity. Contact between the fluid-bearing surface and the second circumferential area burnishes the fluid-bearing surface. The fluid-bearing surface includes one or more contact surfaces (such as 328 and 324) extending toward the test disc. As such, contact between the fluid-bearing surface and the second circumferential area burnishes the one or more contact surfaces. The predetermined surface roughness of the first circumferential area may be set substantially the same as a surface roughness associated with the data storage disc to which the head-gimbal assembly will interface in the disc drive.

In accordance with an embodiment, the control module controls movement of the actuator arm and rotation of the test disc. In this embodiment, the control module rotates the actuator arm over the second circumferential area when contact is detected on the first circumferential area. The test disc may also include a landing zone being a third circumferential area located about an inner diameter of the test disc. The control module positions the head-gimbal assembly on the landing zone as the test disc rotates at a speed less than the test velocity. The control module controls the actuator arm to position the head-gimbal assembly over the first circumferential area after the disc reaches the nominal rotational velocity following from a static, non-rotating state.

In accordance with yet another embodiment, the present invention may be viewed as a method (such as process 500) for certifying a head-gimbal assembly (such as 208) for use in a disc drive (such as 100) wherein the head-gimbal assembly includes a read/write head (such as 118) for accessing data stored on a rotating data storage disc (such as 108). The read/write head is affixed to a fluid-bearing surface (such as 212) of a slider (such as 204). The slider enables the read/write head to fly over the rotating data storage disc.

The method includes the following acts: rotating (such as in operation 504) a test disc (such as 401) at or above a predetermined rotational velocity, positioning (such as in operation 506) the head-gimbal assembly over the test disc as the test disc rotates at or above the predetermined rotational velocity and detecting (such as in operation 510) whether the fluid-bearing surface contacts a surface on the test disc as the test disc rotates at or above the predetermined rotational velocity. The method also includes an act of burnishing (such as in operation 512) the fluid-bearing surface if contact is detected between the fluid-bearing surface and the test disc surface.

In accordance with an embodiment, the rotating act includes acts of accelerating (such as in operation 504) the test disc from a static, non-rotating state to a nominal rotational velocity and, once the test disc is rotating at the nominal rotational velocity, decreasing (such as in operation 508) the rotational velocity of the test disc from the nominal rotational velocity to a test velocity. In accordance with another embodiment, the surface of the test disc may have a circumferential test area (such as 404) operable to detect contact between the fluid-bearing surface and the test disc surface. In this embodiment, the positioning act may also include moving (such as in operation 506) the head-gimbal assembly to the circumferential test area when the test disc reaches the nominal rotational velocity. In this embodiment, the detecting act includes monitoring (such as in operation 510) the circumferential test area to detect contact between the fluid-bearing surface and the test disc surface as the rotational velocity of the test disc is decreased from the nominal rotational velocity to a test velocity. The monitoring act may be administered using Acoustic Emission (AE) testing.

In accordance with an embodiment, the test disc includes a circumferential burnishing area (such as 402) operable to burnish the fluid-bearing surface if contact is detected between the fluid-bearing surface and the test disc surface. The circumferential burnishing area has a predetermined surface roughness greater than a predetermined surface roughness of the circumferential test area. Moreover, the predetermined surface roughness of the circumferential burnishing area is sufficiently high to ensure contact between the fluid-bearing surface and the circumferential burnishing area as the test disc rotates at the test velocity. In this embodiment, the burnishing includes burnishing the fluid-bearing surface using the circumferential burnishing area. Further, the fluid-bearing surface includes one or more contact surfaces extending toward the test disc. As such, the burnishing act further includes burnishing the one or more contact surfaces using the circumferential burnishing area. In yet another embodiment, the predetermined surface roughness of the circumferential test area may be substantially the same as a surface roughness associated with the data storage disc to which the head-gimbal assembly will interface in the disc drive.

The method for certifying a head-gimbal assembly may include an act of repeating (such as initiated in operation 511) the rotating act, the positioning act and the detecting act to determine whether the burnished fluid-bearing surface contacts the test disc surface as the test disc rotates at or above the predetermined rotational velocity. If the burnished fluid-bearing surface contacts the test disc surface as the test disc rotates at or above the predetermined rotational velocity, the method may include marking (such as in operation 514) the head-gimbal assembly as failing certification. Alternatively, the method may include burnishing the burnished fluid-bearing surface if the burnished fluid-bearing surface contacts the test disc surface as the test disc rotates at or above the predetermined rotational velocity.

In accordance with yet another embodiment, the present invention may be viewed as an apparatus (such as 400) for preparing a head-gimbal assembly (such as 208) for installation in a disc drive (such as 100). The head-gimbal assembly has a slider (such as 204) that enables the head-gimbal assembly to fly over a rotating disc (such as 108) in the disc drive. The apparatus includes an actuator arm (such as 414) supporting the head-gimbal assembly over a surface of a rotating test disc (such as 401) such that a fluid bearing is created between the slider and the surface of the test disc.

The apparatus further includes means (such as 404 and 408) for detecting whether the slider contacts the surface of the test disc. The detecting means includes a first circumferential area (such as 404) on the test disc having a predetermined surface roughness substantially the same as a surface roughness associated with the disc to which the head-gimbal assembly will interface in the disc drive. In accordance with an embodiment, the apparatus may also include means (such as 402 and 408) for burnishing the slider if contact is detected between the slider and the surface of the disc. The burnishing means includes a second circumferential area (such as 402) on the test disc having a predetermined surface roughness sufficiently high to ensure contact between slider and the second circumferential area as the test disc rotates at a predetermined velocity.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the present invention is not limited by the particular head configuration shown in FIG. 3. While a particular head configuration is shown and described above, the contact detection and burnishing method described herein will improve the performance of heads with other configurations. For example, a head 118 could have a different number of contact pads in the front or rear or no pad at all, such as in case of a load/unload slider. Likewise, the leading contact pads 324 could extend downwardly far enough so that a surface portion of the leading contact pads 324 would be first to contact the disc surface during flight. Indeed, the head 118 could be configured so that some surface portion other than the features shown in FIG. 3 is first to contact the disc surface.

Additionally, the certification tool 400 is shown with a test disc 401 having a landing zone 406. As such, a contact start-stop (CSS) interface is used between the read/write head 118 and the disc surface 201 to remove the read/write head 118 from the data regions on the disc surface 201 while the rotation of the disc 108 is insufficient to maintain the fluid bearing between the read/write head 118 and the disc surface 201. In this embodiment, the head-gimbal assembly 208 is moved from the landing zone 406 at the inner diameter of the disc 108 to the contact detection area 404, and then, if necessary, to the burnishing area 402. In accordance with an alternative embodiment, a load/unload ramp (not shown) may be used to remove the read/write head 118 from the data regions on the disc surface 201 while the rotation of the disc 108 is insufficient to maintain the fluid bearing between the read/write head 118 and the disc surface 201. In this embodiment, the head-gimbal assembly 208 is moved from the load/unload ramp at the outer diameter of the disc 108 to the contact detection area 404, and then, if necessary, to the burnishing area 402. Numerous other changes may be made which will readily suggest themselves to those skilled in the art and which are encompassed in the spirit of the invention disclosed and as defined in the appended claims.

What is claimed is:

1. A method comprising:
   rotating a disc at a nominal velocity;
   positioning a head-gimbal assembly over the disc,
   wherein the head-gimbal assembly comprises a read/write head affixed to a fluid bearing surface of a slider;
   reducing the disc velocity from the nominal velocity to a test velocity; and
   detecting whether the fluid-bearing surface contacts a surface on the disc as the disc rotates at the test velocity,
   wherein the surface of the disc has a test area used for the detecting,
   wherein the rotating comprises accelerating the disc from a static, non-rotating state to a nominal rotational velocity,
   wherein the positioning comprises moving the head-gimbal assembly to the test area when the disc reaches the nominal velocity.

2. The method of claim 1, further comprising certifying the head-gimbal assembly for installation in the disc drive based on a lack of contact between the fluid-bearing surface and the surface on the disc during the detecting.

3. The method of claim 1, wherein the detecting comprises using Acoustic Emission (AE) testing to determine whether the fluid-bearing surface contacts the surface on the disc.

4. The method of claim 1, further comprising burnishing the fluid bearing surface when contact is detected between the fluid bearing surface and the surface on the disc.

5. The method of claim 4, further comprising burnishing the burnished fluid-bearing surface if the burnished fluid-bearing surface contacts the disc surface as the disc rotates at the test velocity.

6. The method of claim 4, wherein the surface of the disc includes a test area for the detecting step and a burnishing area different than the test area, wherein the burnishing area has a predetermined surface roughness greater than a predetermined surface roughness of the test area.

7. The method of claim 4, further comprising repeating the rotating, the positioning and the detecting to determine whether the burnished fluid-bearing surface contacts the disc surface as the disc rotates at the test velocity.

8. The method of claim 1, wherein the test velocity is a pre-determined velocity.

9. A method comprising:
   rotating a disc at a nominal velocity;
   positioning a head-gimbal assembly over the disc, wherein the head-gimbal assembly comprises a read/write head affixed to a fluid bearing surface of a slider;
   reducing the disc velocity from the nominal velocity to a test velocity;
   detecting whether the fluid-bearing surface contacts a test area of a surface on the disc as the disc rotates at the test velocity,
   wherein the surface of the disc includes a burnishing area different than the test area; and,
   moving the head-gimbal assembly to the burnishing area and burnishing the fluid bearing surface in the burnishing area when the detecting step indicates the fluid-bearing surface contacted the disc in the test area.

10. The method of claim 9, wherein the burnishing area has a predetermined surface roughness greater than a predetermined surface roughness of the test area.

11. The method of claim 10, wherein the fluid-bearing surface comprises one or more contact surfaces extending toward the disc, and wherein the burnishing step includes burnishing the one or more contact surfaces using the burnishing area.

12. The method of claim 10, wherein the predetermined surface roughness of the test area is set substantially the same as a surface roughness of a data storage disc of a disc drive.

13. The method of claim 9, further comprising certifying the head-gimbal assembly for installation in the disc drive based on a lack of contact between the fluid-bearing surface and the surface on the disc during the detecting.

14. The method of claim 9, further comprising repeating the rotating, the positioning and the detecting to determine whether the burnished fluid-bearing surface contacts the disc surface as the disc rotates at the test velocity.

15. A method comprising:
   rotating a disc at a nominal velocity;
   positioning a head-gimbal assembly over the disc, wherein the head-gimbal assembly comprises a read/write head affixed to a fluid bearing surface of a slider;
   reducing the disc velocity from the nominal velocity to a test velocity;
   detecting whether the fluid-bearing surface contacts a surface on the disc as the disc rotates at the test velocity;
   burnishing the fluid bearing surface when contact is detected between the fluid bearing surface and the surface on the disc; and
   repeating the rotating, the positioning and the detecting to determine whether the burnished fluid-bearing surface contacts the disc surface as the disc rotates at the test velocity.

16. The method of claim 15, further comprising marking the head-gimbal assembly as failing certification if the burnished fluid-bearing surface contacts the disc surface as the disc rotates at the test velocity.

17. The method of claim 15, further comprising certifying the head-gimbal assembly for installation in the disc drive based on a lack of contact between the fluid-bearing surface and the surface on the disc during the detecting.

18. The method of claim 15, wherein the surface of the disc has a test area used for the detecting,
   wherein the rotating comprises accelerating the disc from a static, non-rotating state to a nominal rotational velocity,
   wherein the positioning comprises moving the head-gimbal assembly to the test area when the disc reaches the nominal velocity.

19. A method comprising:
   rotating a disc at or above a predetermined rotational velocity;
   positioning a head-gimbal assembly over the disc, wherein the head-gimbal assembly comprises a read/write head affixed to a fluid bearing surface of a slider;
   detecting whether the fluid-bearing surface contacts a surface on the disc as the disc rotates at or above the predetermined rotational velocity; and
   burnishing the fluid bearing surface if contact is detected between the fluid bearing surface and the surface on the disc,
   wherein the surface of the disc has a test area used for the detecting,
   wherein the rotating comprises accelerating the disc from a static, non-rotating state to a nominal rotational velocity,
   wherein the positioning comprises moving the head-gimbal assembly to the test area when the disc reaches the nominal rotational velocity,
   wherein the rotating further comprises, once the disc is rotating at the nominal rotational velocity, decreasing the rotational velocity of the disc from the nominal rotational velocity to a test velocity,
   wherein the detecting comprises monitoring the test area to detect contact between the fluid-bearing surface and the disc surface as the rotational velocity of the disc is decreased from the nominal rotational velocity to a test velocity.

* * * * *